United States Patent [19]

Hayashi

[11] Patent Number: 4,969,545
[45] Date of Patent: Nov. 13, 1990

[54] APPARATUS AND CONTROL METHOD FOR A MAGNETIC POWDER CLUTCH

[75] Inventor: Takashi Hayashi, Susono, Japan

[73] Assignee: Toyota Jidosha Kabushiki Kaisha, Aichi, Japan

[21] Appl. No.: 322,908

[22] Filed: Mar. 14, 1989

Related U.S. Application Data

[62] Division of Ser. No. 55,633, May 29, 1987, Pat. No. 4,867,287.

[30] Foreign Application Priority Data

Jun. 20, 1986 [JP] Japan ................................ 61-145822
Oct. 14, 1986 [JP] Japan ................................ 61-243399

[51] Int. Cl.$^5$ ...................... B60K 41/02; F16D 37/02
[52] U.S. Cl. ................... 192/0.076; 192/21.5; 364/424.1
[58] Field of Search ............... 192/0.032, 0.033, 0.075, 192/0.076, 0.096, 21.5, 103 R; 364/424.1

[56] References Cited

U.S. PATENT DOCUMENTS

| | | | |
|---|---|---|---|
| 4,558,772 | 12/1985 | Grimes et al. | 192/0.076 |
| 4,623,052 | 11/1986 | Watanabe | 192/21.5 |
| 4,638,898 | 1/1987 | Braun | 192/0.076 X |
| 4,678,069 | 7/1987 | Yoshimura et al. | 192/0.033 |
| 4,803,628 | 2/1989 | Hayashi et al. | 364/424.1 |
| 4,811,222 | 3/1989 | Watanabe et al. | 364/424.1 |

FOREIGN PATENT DOCUMENTS

| | | | |
|---|---|---|---|
| 60-171665 | 8/1960 | Japan . | |
| 60-164025 | 8/1985 | Japan . | |
| 61-13035 | 1/1986 | Japan | 192/21.5 |
| 61-211536 | 9/1986 | Japan | 192/0.076 |

OTHER PUBLICATIONS

English Abstract of Japanese Patent No. 60-164025, Aug. 27, 1985.

Primary Examiner—Richard Lorence
Attorney, Agent, or Firm—Oliff & Berridge

[57] ABSTRACT

Disclosed is a control method and controller for a magnetic powder clutch system including a magnetic powder clutch having an input shaft connected to an engine and an output shaft. In the method, the magnetic powder clutch is energized by an energizing strength which is determined based on a target transmitting torque. The energizing strength is compensated with a predetermined correction factor to realize high accuracy control. Moreover, the correction factor is always updated in response to an error between the target transmitting torque and the detected actual transmitting torque.

5 Claims, 19 Drawing Sheets

APPARATUS AND CONTROL METHOD FOR A MAGNETIC POWDER CLUTCH

This is a division of application Ser. No. 07/055,633 filed May 29, 1987, now U.S. Pat. No. 4,867,287.

TECHNICAL FIELD

This invention relates to a controller and a control method for a magnetic powder clutch of a vehicle.

BACKGROUND OF THE INVENTION

A method for controlling a magnetic powder clutch of a transmission installed between an engine and drive wheels has been disclosed in Japanese Patent Application No. Sho 60-171665. In this art, when a vehicle is starting, the transmitting torque of the magnetic powder clutch is developed from 0 N.m in the idling state to be equal to an engine torque at a target engagement revolution speed. Here, the engagement revolution speed is obtained when the revolution speed of the input shaft and the output shaft of the clutch is substantially the same. The transmitting torque TCL of the magnetic powder clutch is controlled based on the following equation (1).

$$TCL = Te + k \cdot (Ne - N^*) \quad (1)$$

where
Te : engine torque,
Ne : engine revolution speed,
k : feedback gain, and
N* : target engagement revolution speed.

The transmitting torque TCL is thus calculated based on the current engine torque Te and the current engine revolution speed Ne. Then, an energizing voltage VCL responsive to the transmitting torque TCL is determined in reference to the characteristic curve of the magnetic powder clutch shown in FIG. 18. By applying the voltage VCL to the magnetic powder clutch, the transmitting torque TCL becomes equal to the engine torque Te at the target engagement revolution speed N*. In the above control method, however, the characteristic at the starting of the vehicle changes since the efficiency of the transmitting torque of the clutch gradually changes with the lapse of time. To cope with this, an improved version of this method has been developed in Japanese Published Unexamined Patent Application No. Sho 60-164025 in that the change in the efficiency of the transmitting torque of the magnetic powder clutch is detected based on a stall revolution speed of the clutch, i.e., a revolution speed at which the engine revolution speed is saturated under the condition of zero vehicle speed and wide open throttle. Thus, the change in the transient characteristic of the magnetic powder clutch has been controlled.

However, when the transmitting torque TCL of the magnetic powder clutch is controlled to be equal to the engine torque at the target engagement revolution speed N*, a problem set forth sometimes occurs. FIG. 19 shows the relationship between the transmitting torque TCL and the energizing voltage VCL, the solid line indicates a designated curve. If the designated curve shifts in the direction of YA or YB with the lapse of time, the transmitting torque TCL does not necessarily become equal to the engine torque at the target engagement revolution speed N*. When the vehicle is starting, a required transmitting torque $\widetilde{TCL}$ that the magnetic powder clutch should transmit is calculated as follows in reference to equation (1).

$$\widetilde{TCL} = \widetilde{Te} + k \cdot (Ne - N^*) \quad (2)$$

where
$\widetilde{TCL}$ : a required transmitting torque, and
$\widetilde{Te}$ : an estimated engine torque.

Accordingly, if the actual transmitting torque $\widetilde{TCL}$ of the magnetic powder clutch is equal to the required transmitting torque $\widetilde{TCL}$, and also the actual engine torque Te is equal to the estimated engine torque Te, the control for the magnetic powder clutch at the starting of the vehicle is accurately performed according to equation (1) so that the clutch is engaged at the target engagement revolution speed N*.

Generally, the relationship of equation (3) exists in the engine and the magnetic powder clutch system.

$$In \cdot \dot{Ne} = Te - TCL \quad (3)$$

where
In : inertia moment of engine
$\dot{Ne}$ : change rate in the engine revolution speed,
Te : engine torque, and
TCL : transmitting torque.

In reference to equations (2) and (3), when TCL = $\widetilde{TCL}$, the engine revolution speed Ne changes in relation to time t based on the following equation (4).

$$In \cdot \dot{Ne} = -k \cdot (Ne - N^*) \quad (4)$$

From equation (4), the engine revolution speed Ne is calculated as shown in the equation (5).

$$Ne = Nidle \cdot exp(-k \cdot t/In) + \{1 - exp(-k \cdot t/In)\} \cdot N^* \quad (5)$$

When t=0, Ne becomes equal to Nidle. As the time t approaches infinity (t→∞), the engine revolution speed gets closer to the target engagement revolution speed N*. On the other hand, if TCL ≠ $\widetilde{TCL}$, the following equation (6) is obtained in reference to the equations (2) and (3).

$$\begin{aligned} In \cdot \widetilde{Ne} &= \widetilde{Te} - \{Te + k \cdot (Ne - N^*)\} \\ &= (Te - \widetilde{Te}) - k \cdot (Ne - N^*). \end{aligned} \quad (6)$$

Here, the term (Te - $\widetilde{Te}$) is involved in the equation. The engagement revolution speed, therefore, does not coincide with the target engagement revolution speed N*.

The change in the clutch characteristic sometimes brings about problems such as shock or delay in the starting of the vehicle, or deterioration of the accuracy in disengagement. Though it is possible to detect the change in the magnetic powder clutch characteristic from its stall revolution speed when the vehicle stops, a further problem is left. Namely, the stall revolution speed of the magnetic powder clutch can not be detected under the usual driving condition. To make it possible, a driver must apply the hand-brake and depress the accelerator to make the throttle wide-open. As a result, hard noise is caused and the durability of the magnetic powder clutch deteriorates.

SUMMARY OF THE INVENTION

Accordingly, one object of the present invention is to provide an improved control method for a magnetic powder clutch which realizes the most appropriate control of the powder clutch by regulating the change in the powder clutch characteristic in relation to time and the disparity among the products.

One aspect of the present invention is shown in FIG. 1, in which a controller for a magnetic powder clutch having an input shaft connected to an engine and an output shaft includes: an engine revolution speed detection means MB; a target engagement revolution speed signal generating means ME; a first difference calculation means MF for calculating the first difference between the target engagement revolution speed and a sensed engine revolution speed; a clutch control means MG for generating an energizing strength signal of the magnetic powder clutch MD according to a predetermined rule based on the calculated first difference until the input shaft and the output shaft are engaged; an actual engagement revolution speed detection means MI; a second difference calculation means MJ for calculating a second difference between the target engagement revolution speed signal and the actual engagement revolution speed signal; and an energizing strength correction means MK for correcting the energizing voltage or electricity for the magnetic powder clutch so as to decrease the error of the engagement revolution speed.

Moreover, the clutch control means MG may include a torque detection means MC which directly detects the output torque of an engine MA or calculates the output torque based on the engine revolution speed and the engine load.

Finally, an energizing means MH energizes the magnetic powder clutch MD based on the energizing strength signal generated by the clutch control means MG.

In the present invention, the first difference calculation means MF calculates the difference between the engine revolution speed detected by the means MB and the target engagement revolution speed determined by the means ME. Based on this calculated difference and the engine torque detected by the means MC, the clutch control means MG calculates the energizing strength of the magnetic powder clutch MD at the starting of the vehicle. On the other hand, the second difference calculation means MJ calculates the difference between the target engagement revolution speed determined by the means ME and the actual engagement revolution speed detected by the means MI. On the basis of this difference, the engaging strength correction means MK corrects the energizing strength of the magnetic powder clutch MD. Then, the energizing means MH actually energizes the magnetic powder clutch MD based on the corrected energizing strength. Accordingly, even if the relationship between the energizing voltage VCL and the transmitting torque TCL shown in FIG. 19 changes in the direction of YA or YB with the lapse of time, the changed value shown by a dashed line can be corrected to the preset value shown by a solid line in the figure by altering the energizing strength so as to diminish the engagement revolution speed error. For example, when the relationship curve shifts in the direction of YB, the actual transmitting torque TCL becomes lower than the required transmitting torque $\overline{TCL}$, thereby the actual engagement revolution speed becomes higher than the target engagement revolution speed N*. The difference ΔTCL between the actual transmitting torque TCL and the required transmitting torque $\overline{TCL}$ can be estimated from the above-mentioned increase in the engagement revolution speed based on the following equation (7).

$$\Delta TCL = TCLO + TCLB = k \cdot (Ne - N^*) \quad (7)$$

where
TCLO : a preset transmitting torque, and
TCLB : decreased transmitting torque.

Supposing that ΔTCL/TCLO=constant in the whole range of the transmitting torque, the energizing voltage VCL or the energizing current ICL is increased so as to increase the transmitting torque by the amount of ΔTCL. Thus, the transmitting torque TCL of the magnetic powder clutch MD is always controlled to be equal to the target value. As a result, the shock at the starting of the vehicle is minimized and the starting acceleration is increased. Moreover, the durability of the powder clutch is improved.

By correcting the energizing strength to diminish the engagement revolution speed error, the magnetic powder clutch MD is correctly engaged at a target engagement revolution speed. Moreover, with the above-mentioned energizing strength correction control, the change in the characteristic of the magnetic powder clutch MD can be corrected so as to realize a desired clutch-slipping control in which the target transmitting torque is accurately achieved. Since the start control and the clutch slipping control can be realized in high accuracy by utilizing the present invention, both the starting efficiency and the durability of the magnetic powder clutch are improved.

Another aspect of the present invention will be best understood by reference to the flowchart of FIG. 2. As shown in the flow chart, a control method for a magnetic powder clutch system of the present invention includes the steps of: determining an energizing strength of the magnetic powder clutch based on a target transmitting torque (Step SE); correcting the energizing strength with a correction factor determined based on a specific powder clutch (Step SF); and energizing the magnetic powder clutch with the corrected energizing strength (Step SG). In addition to these steps, the present invention further includes steps of: determining an actual transmitting torque of the magnetic powder clutch (Step SB) when a change in the transmitting torque is determined to be smaller than a preset value (Step SA); calculating an error between the target transmitting torque and the detected actual transmitting torque (SC); and updating the correction factor according to the calculated error (SD). The important feature of the present invention can be seen in steps SA through SD.

The determination condition at Step SA detects, for example, such a time when the fluctuation in the transmitting torque of the magnetic powder clutch is less than a preset value under a constant engine revolution speed.

The transmitting torque of the magnetic powder clutch is detected by a torque meter installed in a torque transmitting path between the engine and drive wheels. Alternatively, it can be estimated from the throttle opening and the revolution speed of the engine.

When the fluctuation in the transmitting torque of the magnetic powder clutch is smaller than a predetermined value, the characteristic correction value for correcting the energizing strength of the clutch in response to the characteristic of the magnetic powder clutch is updated on the basis of the actual transmitting torque and the target transmitting torque. Thus, the energizing strength of the magnetic powder clutch responsive to the target transmitting torque is corrected based on the above-mentioned updated correction value. As a result, when the magnetic powder clutch characteristic changes with time, and accordingly the difference between the actual transmitting torque and the target transmitting torque increases with time, the transmitting torque error can be minimized.

In this method, excessive load is not applied to the magnetic powder clutch as in the prior art stall revolution detection method. Moreover, the transmitting torque is always maintained at a target level without the driver's special operation to correct the change in the magnetic powder clutch characteristic. As a result, overslipping of the magnetic powder clutch is prevented so that the durability of the clutch and the gas mileage are improved. Furthermore, the transmitting torque control for controlling vehicle starting and clutch slipping can be accurately performed, which results in improving maneuverability of the vehicle.

BRIEF DESCRIPTION OF DRAWINGS

By way of example and to make the description more clear, reference is made to accompanying drawings in which.

DETAILED DESCRIPTION OF PREFERRED EMBODIMENTS

The first embodiment of the present invention is described in reference to FIGS. 3 through 10.

Figure 1:
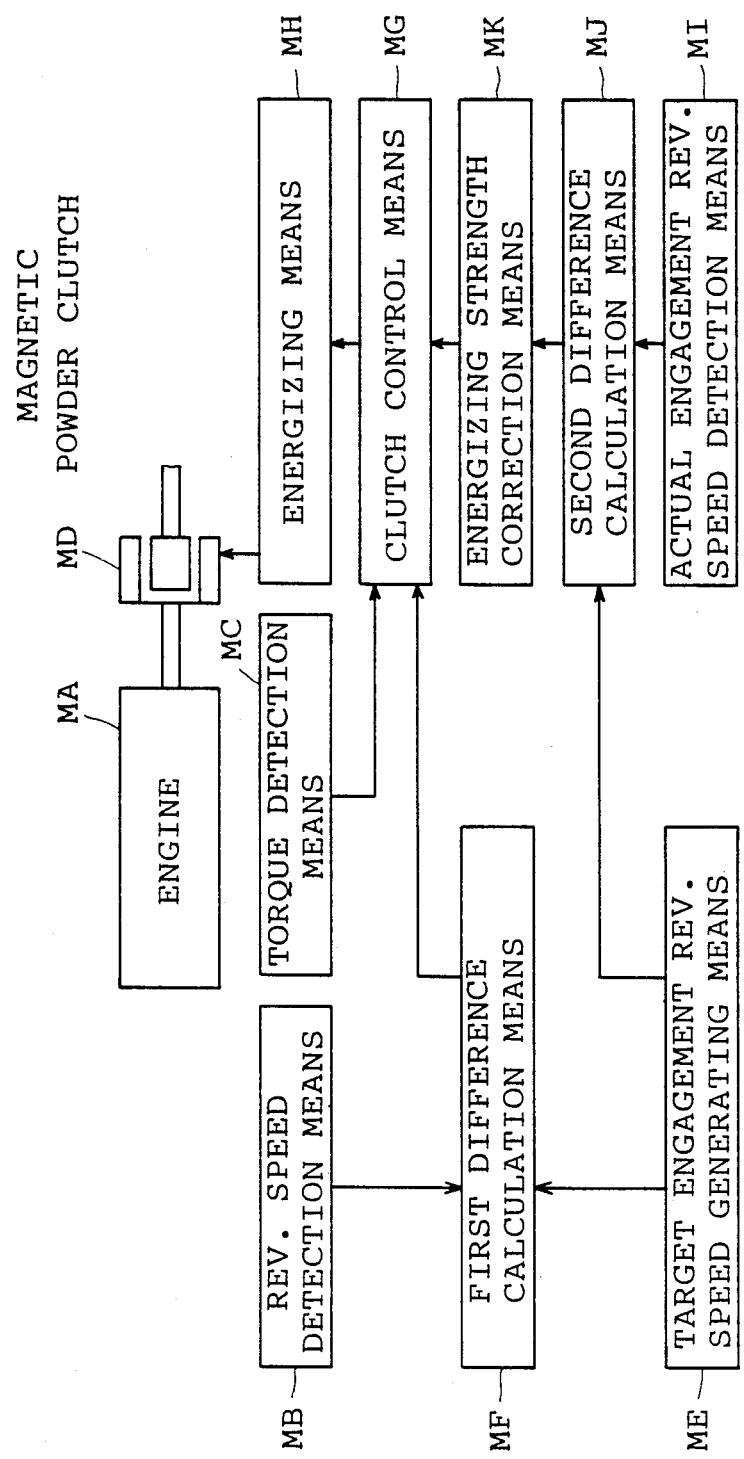
FIG. 1 is a schematic view of a basic structure of one aspect of the present invention.
Figure 2:
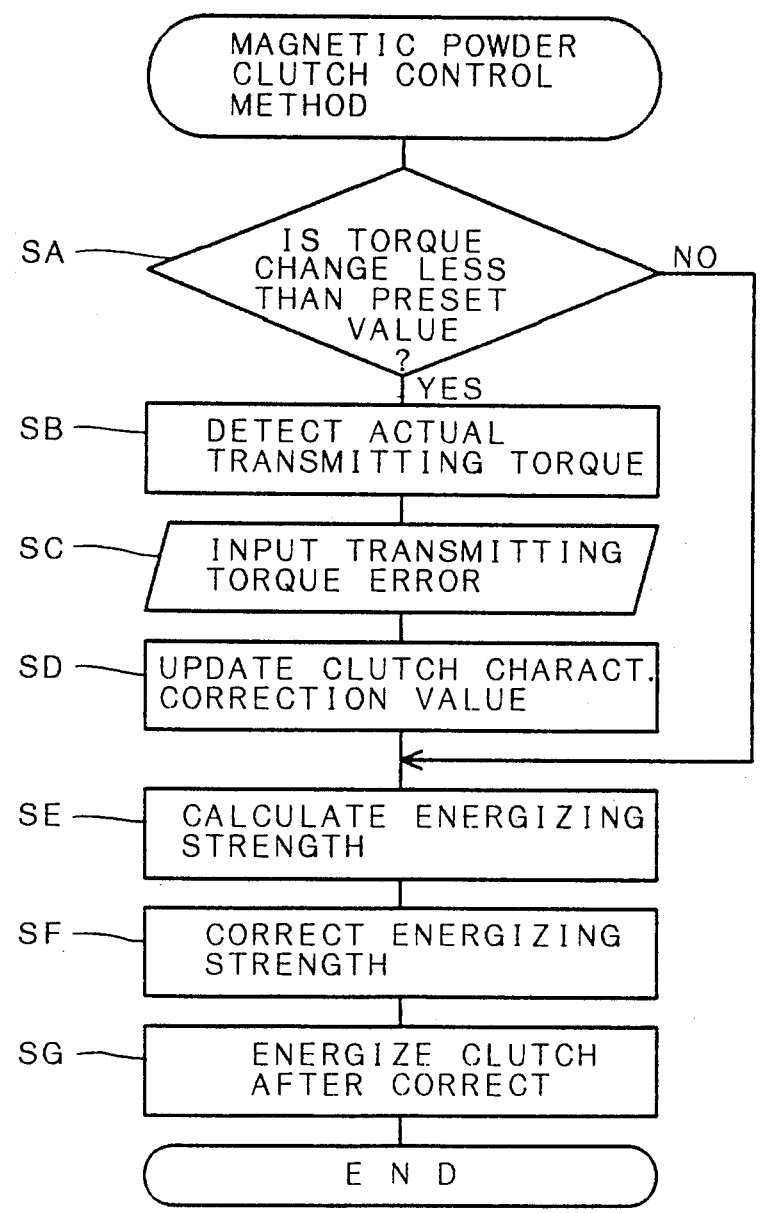
FIG. 2 is a flow chart explaining an example of a control method the present invention.
Figure 3:
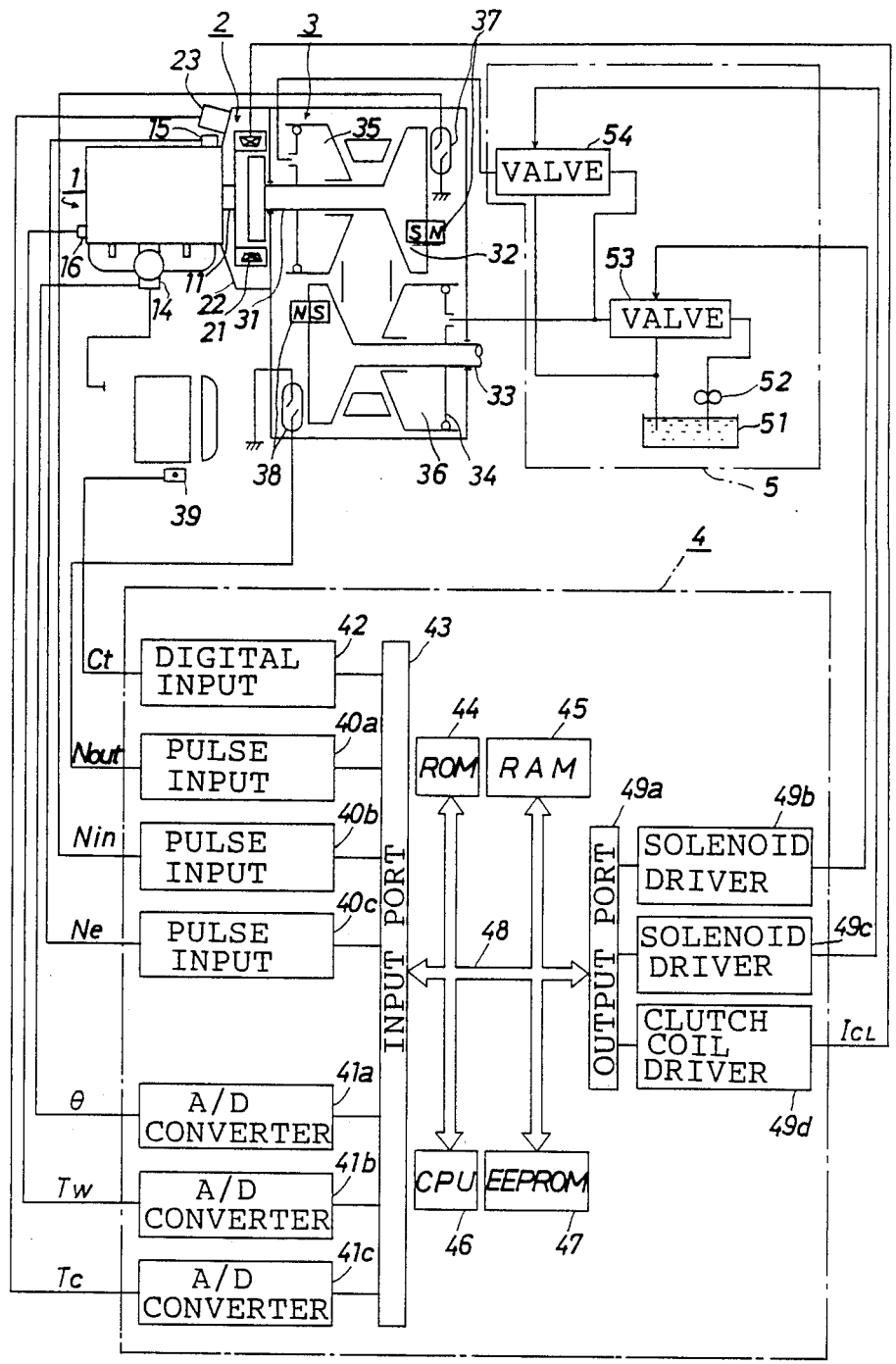
FIG. 3 is a schematic view illustrating a fundamental structure of the embodiment.

FIG. 3 illustrates the fundamental structure of the first embodiment. As shown in the figure, the first embodiment is substantially composed of an engine 1, a magnetic powder clutch 2, a continuously variable transmission (CVT) 3 and an electronic control unit (ECU) 4.

The magnetic powder clutch 2 is installed between an output shaft 11 of the engine 1 and an input shaft 31 of the CVT 3. The magnetic powder clutch 2 includes energizing coils 21 within its housing 22 to engage the clutch 2. The CVT 3 consists of an input-side pulley 32 and an output-side pulley 34 with an output shaft 33. The pulleys 32 and 34 respectively includes oil hydraulic chambers 35 and 36 which are pressurized by a speed ratio controller 5 for controlling the speed ratio of the CVT 3. The speed ratio controller 5 is equipped with an oil pump 52 for supplying work oil from an oil tank 51, a pressure control valve 53 for controlling the pressure of the oil flow and an oil flow control valve 54 for controlling the flow amount of the oil.

The ECU 4 controls the magnetic powder clutch 2 and the CVT 3 based on various data detected by the sensors installed in the engine 1, the magnetic powder clutch 2, the CVT 3 and the speed ratio controller 5. The data inputted into the ECU 4 are set forth: a throttle opening $\theta$ of the engine 1 detected by a throttle opening sensor 14; a coolant temperature Tw detected by a coolant temperature sensor 16; an engine revolution speed Ne detected by an engine revolution speed sensor 15; a housing temperature Tc detected by a clutch environment temperature sensor 23; an input revolution speed Nin detected by a revolution speed sensor 37 of the input-side pulley 32; output revolution speed Nout detected by a revolution speed sensor 38 of the output-side pulley 34; and a shift position Ct detected by a shift position sensor 39. The ECU 4 controls the energizing coils 21 of the magnetic powder clutch 2, the pressure control valve 53 and the flow control valve 54 of the speed ratio controller 5. The above-mentioned various data are inputted into an input port 43 via pulse input sections 40a through 40c, A/D converters 41a through 41c and a digital input section 42.

Figure 4:
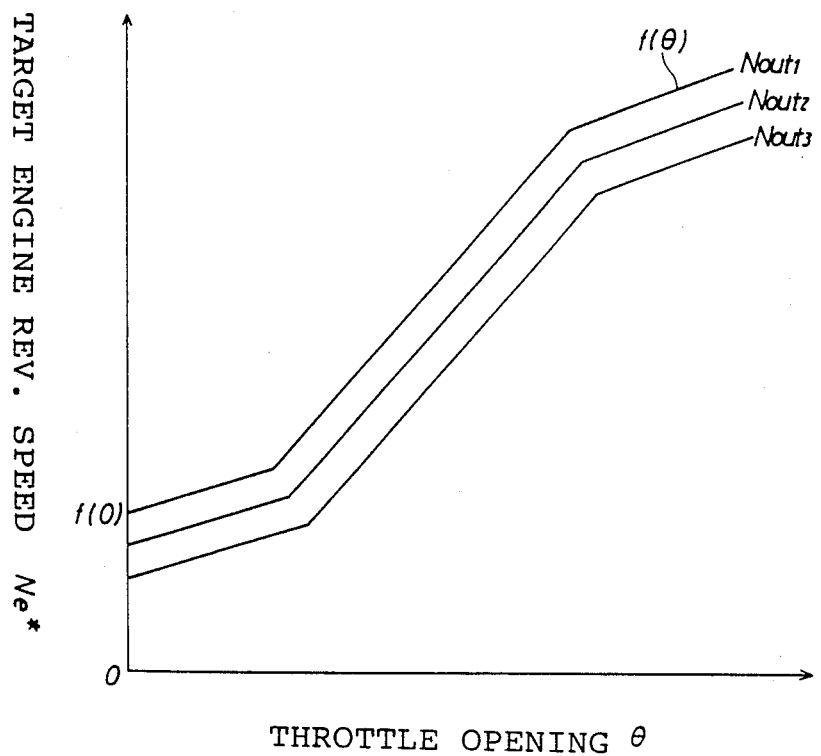
FIG. 4 is a graph indicating a speed ratio control characteristic a continuously variable transmission (CVT)

Based on these input data, a microcomputer, which is composed of a ROM 44, a RAM 45, a CPU 46, an EEPROM 47 and a common bus 48, generates the control parameters for the magnetic powder clutch 2 and the CVT 3 in accordance with the program stored in the ROM 44. The generated parameters are inputted into an output port 49a. Then, the data are outputted to the magnetic powder clutch 2 and the speed ratio controller 5 via solenoid valve actuators 49b and 49c and an energizing coil driver 49d. Thus, the control of the transmitting torque of the magnetic powder clutch 2 and the speed ratio control of the CVT 3 of the present embodiment are performed. The speed ratio control of the CVT 3 is performed based on a characteristic curve of FIG. 4 showing the relationship between the throttle opening $\theta$ and a target engine revolution speed Ne* in response to each of the output revolution speeds Nout1, Nout2 and Nout3 of the CVT 3.

Figure 5:
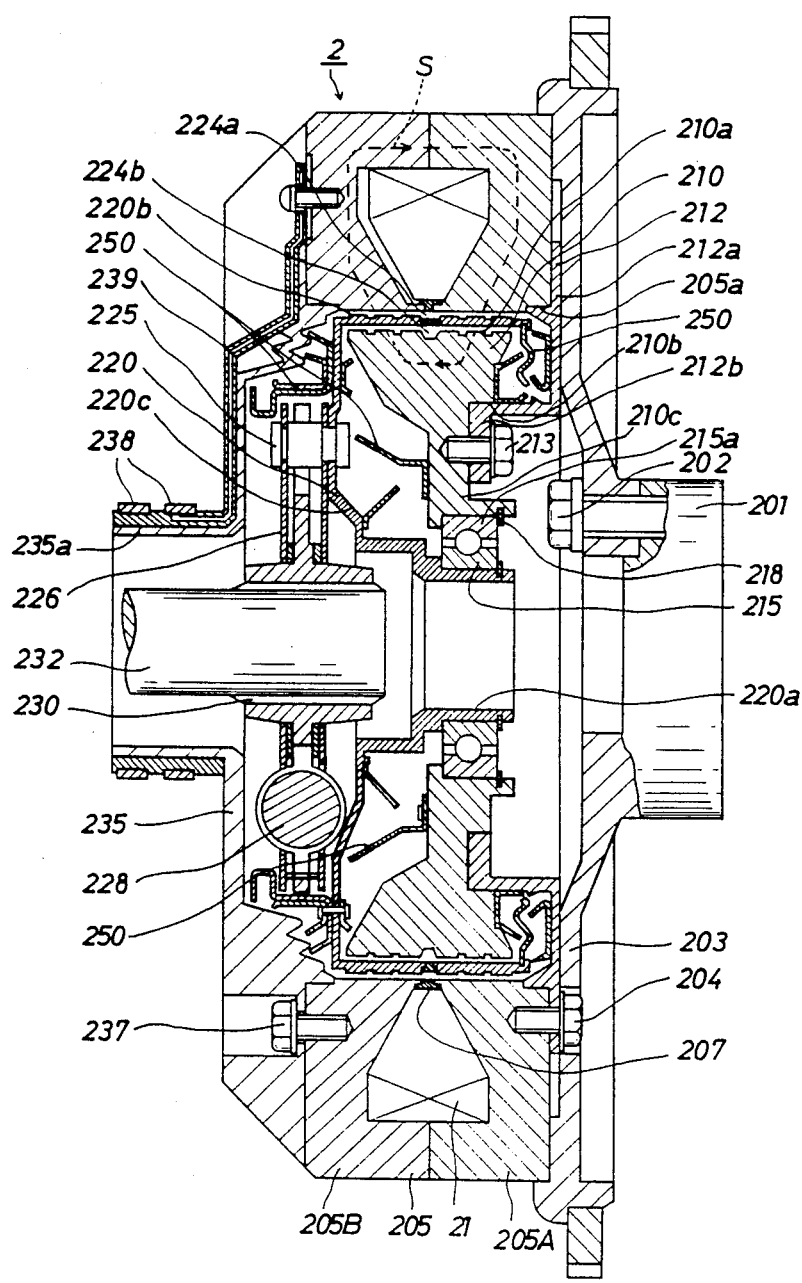
FIG. 5 is a sectional view of the magnetic powder clutch of the first embodiment.

Next, the structure of the magnetic powder clutch 2 is described in reference to the sectional view of FIG. 5.

A drive shaft 201 of the magnetic powder clutch 2 is connected to an end of the output shaft 11 of the engine 1 (ref: FIG. 3). As shown in the figure, a flywheel 203 is attached to the drive shaft 201 with bolts 202, and a first member 205 is connected to the flywheel 203 with other unillustrated bolts. The first member is a doughnut-shaped component being composed of two circular members 205A and 205B which are made of magnetic materials such as low carbon steel. An energizing coil 21 is inserted through the doughnut, and also a piece 207 made of non-magnetic material such as SUS304 steel is provided on the internal surface of the doughnut. Within the first member 205, a second member 210 having a friction surface 210a is installed. The second member 210 is also made of a magnetic material such as low carbon steel. The second member 210 is connected to the first member 205 via a connecting member 212 with bolts 204 and 213. An outer periphery 212a of the connecting member 212 is engaged with a recess 205a of the first member 205 and an inner periphery 212b of the connecting member 212 is engaged with a recess 210b of the second member 210 so as to fixedly position the first member and the second member. An outer race 215a of a bearing 215 is positioned by an inner periphery 210c of the second member 210 and by a snap ring 218, and is installed between the second member 210 and the outer periphery of an inner cylindrical portion 220a of a third member 220. An outer cylindrical portion 220b of the third member 220 is inserted between the first member 205 and the second member 210, making a first gap 224a and a second gap 224b in which magnetic powder (not shown) is filled. This is a so-called multiple gap clutch.

The third member 220, made of ferromagnetic material like low carbon steel, integrally consists of the inner cylindrical portion 220a, the outer cylindrical portion 220b and a ring plate portion 220c. The ring plate portion 220c has a seal-up construction to prevent the magnetic powder from spilling out of the second gap 224b. The ring plate portion 220c is connected to a cylindrical hub portion 230 via a pin 225, a connecting member 226 and a rubber damper 228. A drive shaft 232, which is connected to an input shaft 31 of the CVT 3 (ref: FIG. 3), has splines which are engaged with the internal surface of the hub portion 230. A cover member 235 is provided to the outer periphery of the drive shaft 232, and is connected to the first member 205 with a bolt 237. Moreover, slip rings 238 are provided on the outer surface of a cylindrical part 235a of the cover member 235 so as to supply electricity to the energizing coil 21 via a conduction path 239. Furthermore, a labyrinth 250 is formed to prevent the magnetic powder from spilling out of the gaps 224a and 224b.

Set forth below is the explanation of the magnetic powder clutch of the first embodiment having the abovementioned features.

The clutch is engaged by supplying electricity to the energizing coil 21 via slip rings 238 and the conduction path 239. When the coil 21 is energized, magnetic flux shown by a dashed line S is generated. Due to the action of the magnetic flux, each of the magnetic powder in the gaps 224a and 224b unites together to make a chain-like form. By the friction force and magnetic attraction force among the magnetic powders, the first and the second members 205 and 210 as driving members are connected to the third members 220 as a driven member so as to transmit the revolution and torque.

Figure 7:
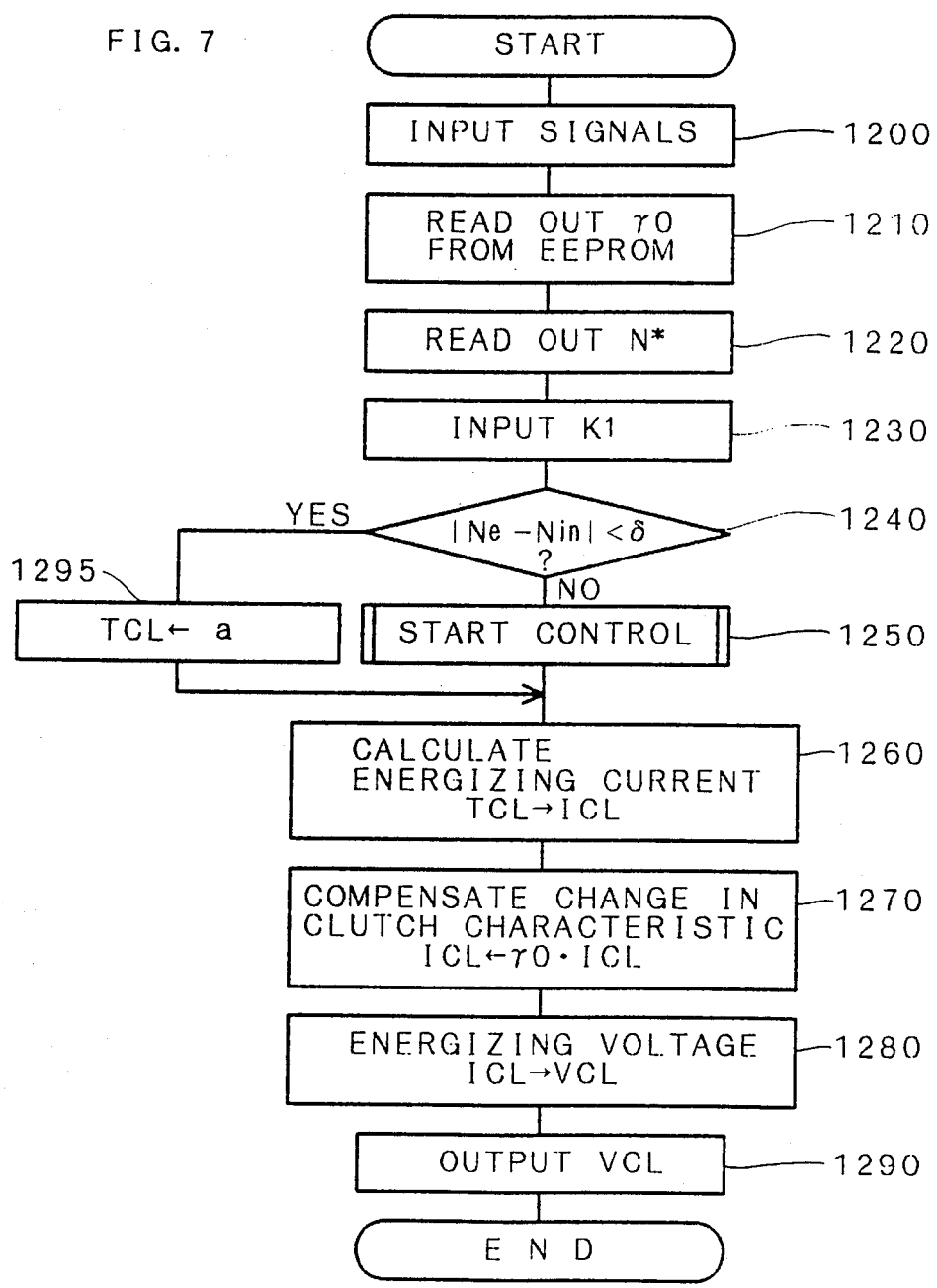
FIG. 7 is a flow chart of a magnetic powder clutch control the first embodiment.
Figure 8:
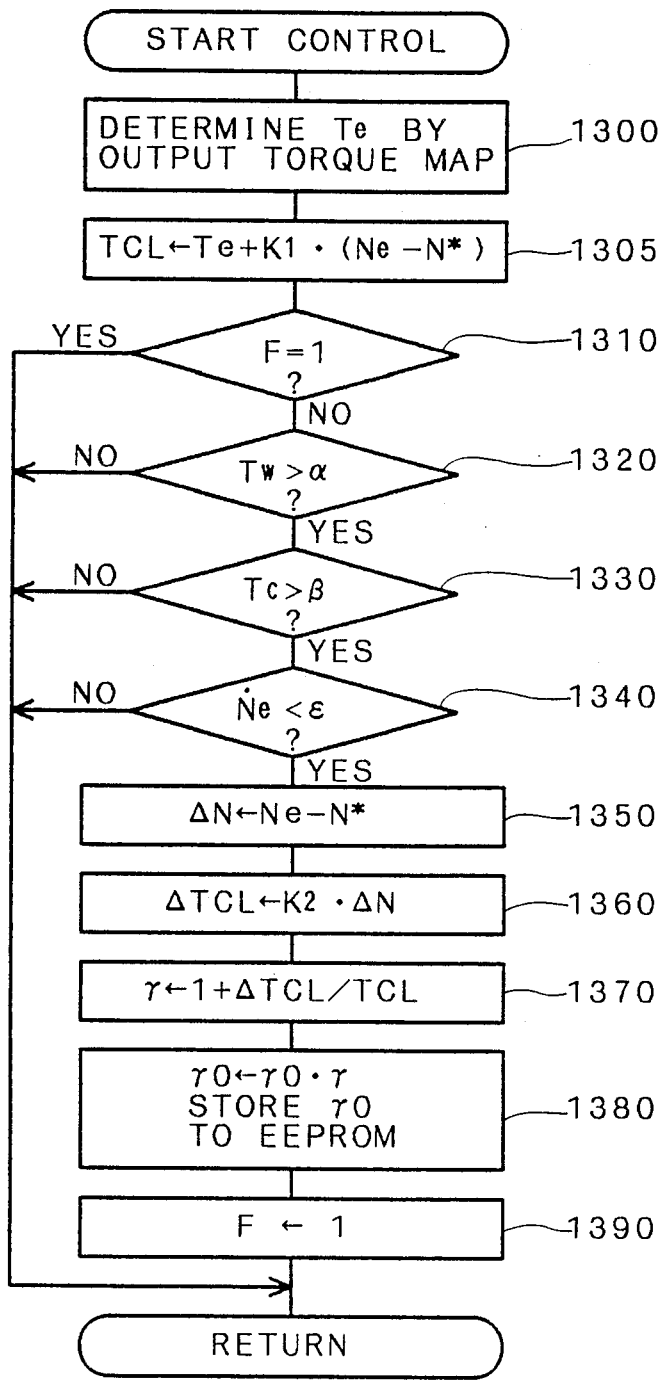
FIG. 8 is a flow chart of a start control routine of the first embodiment.

Next, an example of the control of the first embodiment is described in reference to the flow charts of FIGS. 7 and 8.

Figure 9:
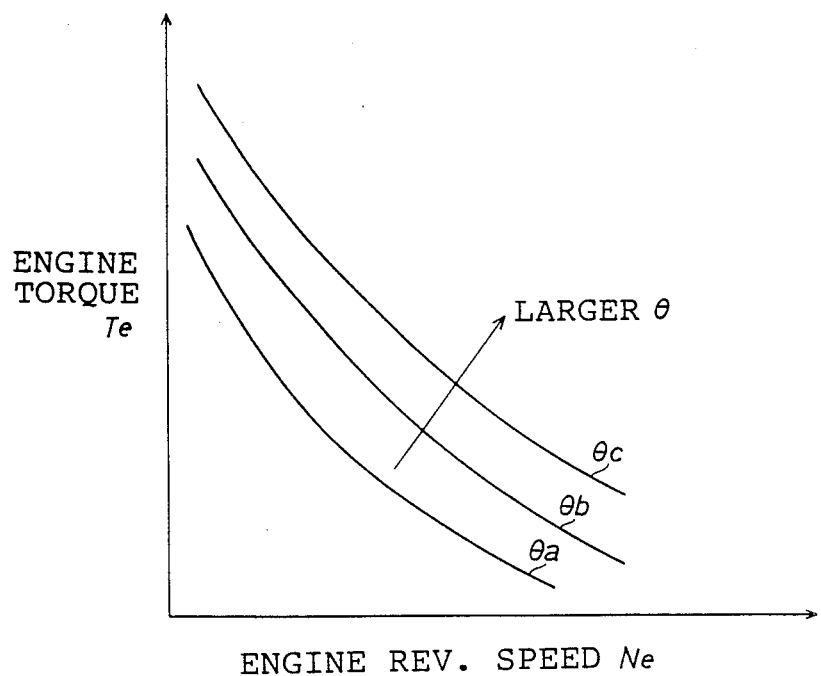
FIG. 9 is a graph showing an engine torque characteristic the first embodiment.

First of all, various sensor input signals to be used in the present control is inputted at step 1200. A correction coefficient $\gamma$ for correcting the change in the characteristic of the magnetic powder clutch, which has been calculated and stored in an electrically erasable programmable ROM (EEPROM) 47 at the previous time of starting of the vehicle, is read out from the EEPROM 47 at step 1210. At the subsequent step 1220, a target engagement revolution speed $N^*$ is read out from a target engagement revolution speed setting routine (not shown). Then, at step 1230, a starting characteristic coefficient k1 is read out from a starting characteristic setting routine (not shown). In those routines, the values $N^*$ and k1 are determined mainly based on the throttle opening. The values are used in the calculation of a transmitting torque TCL afterward in this routine. After the above-mentioned various data are read out, it is determined whether the start control of the magnetic powder clutch 2 should be carried out at step 1240. Namely, it is determined whether the difference between the engine revolution speed Ne and the input shaft revolution speed Nin of the CVT 3 is less than a preset value $\delta$. If the answer is 'NO', the start control is carried out at step 1250 in accordance with the start control routine shown in FIG. 8. At the beginning step 1300 of the start control routine, an engine torque Te is estimated according to a characteristic curve of FIG. 9 showing the relationship between the engine revolution speed Ne and the engine torque Te responsive to each of the throttle openings $\theta a$, $\theta b$ and $\theta c$. By utilizing the starting characteristic coefficient k1, the engine revolution speed Ne and the target engagement revolution speed $N^*$ read out at steps 1200 through 1230, the transmitting torque TCL is calculated at step 1305 as shown in the following equation (8);

$$TCL = Te + k1 \cdot (Ne - N) \tag{8}$$

Subsequently, the calculation of the characteristic correction coefficient $\gamma o$, the most important point of the present embodiment, is carried out at steps 1310 through 1390. The steps 1310 and 1390 are the determination points for determining whether the $\gamma o$-calculation routine (steps 1320 through 1380) is executed only once during the initial movement of the vehicle. Namely, since the flag F is reset to 0 at the initialization step when the ECU is turned on, the determination result at step 1310 is NO and, if the other conditions are satisfied at determination steps 1320 to 1340, the flag F is set to 1 at step 1390. Therefore from the next time on, as the flag F is always 1, the steps 1320 to 1390 will never be executed.

Figure 10:
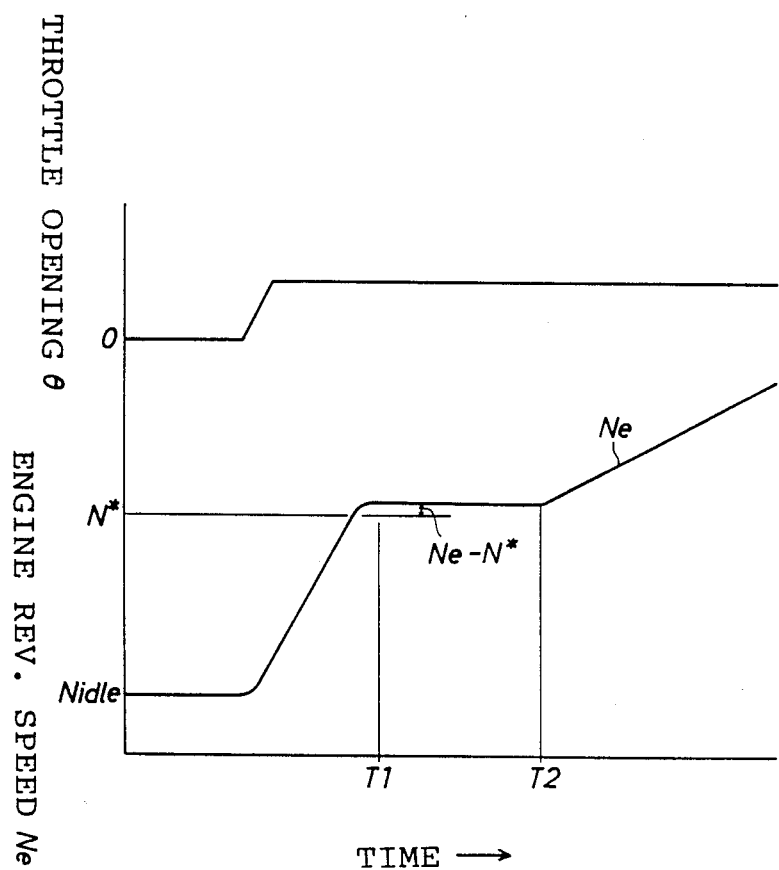
FIG. 10 is a timing chart showing the change in the throttle opening and the engine revolution speed in relation to time in the first embodiment.

When it is determined that the flag F is 0 at step 1310, the process step proceeds to step 1320 where the coolant temperature Tw is compared with a preset value $\alpha$. If $Tw > \alpha$, the next step 1330 is carried out to determine whether the housing temperature Tc of the magnetic powder clutch 2 is higher than a preset value $\beta$. The above-mentioned steps 1320 and 1330 are for determining whether the magnetic powder clutch 2 and the engine 1 have warmed up. When it is determined that the conditions are ready for the calculation of the characteristic correction coefficient $\gamma o$, it is then determined at step 1340 whether the magnetic powder clutch 2 is engaged by comparing the change rate $\dot{N}e$ of the engine revolution speed Ne with a preset small value $\epsilon$. As shown in FIG. 10, the change rate of Ne temporarily becomes small at the time point T1 and it levels off until the time point T2. This means that the magnetic powder clutch 2 is engaged at the time point T1. Returning to the flow chart of FIG. 8, at step 1350, the difference $\Delta N$ between the engine revolution speed Ne and the target engagement revolution speed N* is calculated. After that, the transmitting torque error $\Delta TCL$ is calculated at step 1360 by multiplying the abovecalculated calculated $\Delta N$ by a change coefficient k2. At the subsequent step 1370, an error correction coefficient $\gamma$ is determined in accordance with the following equation (9);

$$\gamma = 1 + \Delta TCL/TCL \qquad (9)$$

where
TCL: a present transmitting torque.

By determining the error correction coefficient $\gamma$ based on $\Delta N$ and $\Delta TCL$, the clutch characteristic correction coefficient $\gamma o$ is conformed to the current characteristic of the magnetic powder clutch 2. Namely, the correction coefficient $\gamma o$ is updated according to the equation (10);

$$\gamma o = \gamma o \cdot \gamma \qquad (10)$$

Then, the updated $\gamma o$ is stored in the EEPROM 47 at step 1380 to be utilized in the forthcoming calculation processes. Even though the ignition key is switched off, the updated $\gamma o$ stored in the EEPROM can be read out when the present calculation routine is restarted. In case a characteristic change in a short period is to be memorized, it is possible to store the correction coefficient $\gamma o$ in a RAM 45. At step 1390, the flag F is set to 1. Accordingly the $\gamma o$-correction process steps 1320 through 1380 are never repeated thereafter until the ignition key is turned on the next time.

Figure 6:
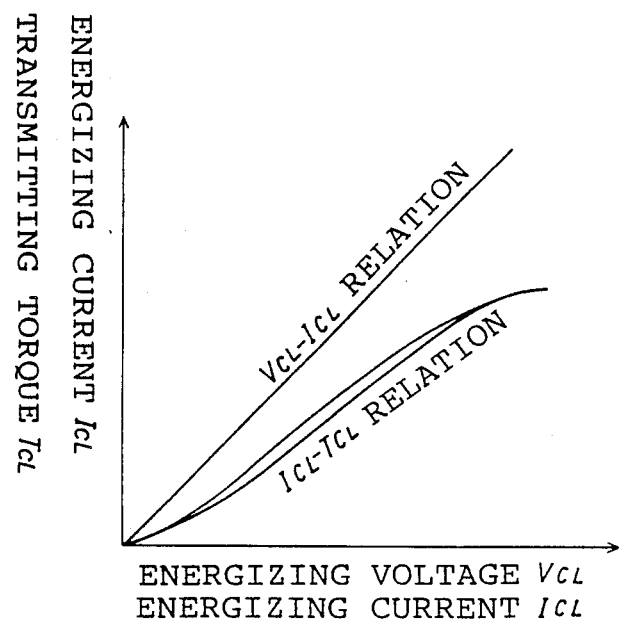
FIG. 6 is a graph showing an energizing characteristic of the magnetic powder clutch of the first embodiment.

After the above-mentioned start control routine (Steps 1300 through 1390) is concluded, the process step returns to step 1260 in the flow chart of FIG. 7. At step 1260, an energizing current ICL responsive to the transmitting torque TCL calculated at step 1305 (FIG. 8) is determined based on FIG. 6 showing the relationship between ICL and TCL. The ICL - TCL relation curve has been stored in a ROM 44. At the subsequent step 1270, the calculated energizing current ICL is corrected by the characteristic correction coefficient $\gamma o$ which is stored in the EEPROM 47. With this correction, the change in the characteristic o the magnetic powder clutch 2 is compensated, and then, the energizing current ICL in response to the transmitting torque TCL calculated at step 1305 is obtained. After that, an energizing voltage VCL responsive to the above-mentioned ICL is determined at step 1280 based on the VCL - ICL relation curve of FIG. 6 stored in the ROM 44, and the determined VCL is outputted from an clutch coil driver 49d( ref: FIG. 3) at step 1290. Thus, the updated energizing voltage VCL for realizing the transmitting torque TCL is applied to the energizing coil 21.

On the other hand, when the start control routine is not executed, i.e., if it is determined that $|Ne - Nin| < \delta$ at step 1240, a constant a is substituted for the transmitting torque TCL at step 1295. The constant a may be set at a maximum transmitting torque in order to assure the engagement. Alternatively, it may be set at a required minimum transmitting torque for maintaining the engaged condition of the clutch so as to minimize the power consumption.

As described hereinbefore, in the first embodiment, the clutch characteristic correction coefficient $\gamma o$ for correcting the change in the magnetic powder clutch characteristic to a target value, is determined based on the difference $\Delta N$ between the actual engagement revolution speed Ne and the target engagement revolution speed N*. Then, the energizing current ICL is corrected by the correction coefficient $\gamma o$ so that the actual transmitting torque TCL of the magnetic powder clutch 2 becomes equal to the torque TCL calculated for executing the start control. Thus, the transmitting torque TCL of the magnetic powder clutch 2 can be accurately controlled to be a target value. Even though the characteristic of the magnetic powder clutch 2 varies or changes with the lapse of time, the start control can be accurately carried out. As a result, a highly improved magnetic powder clutch controller, featuring high responsiveness and durability and minimum shock in the start control, can be provided.

Set forth below is the explanation of the second embodiment of the present invention.

Figure 11:
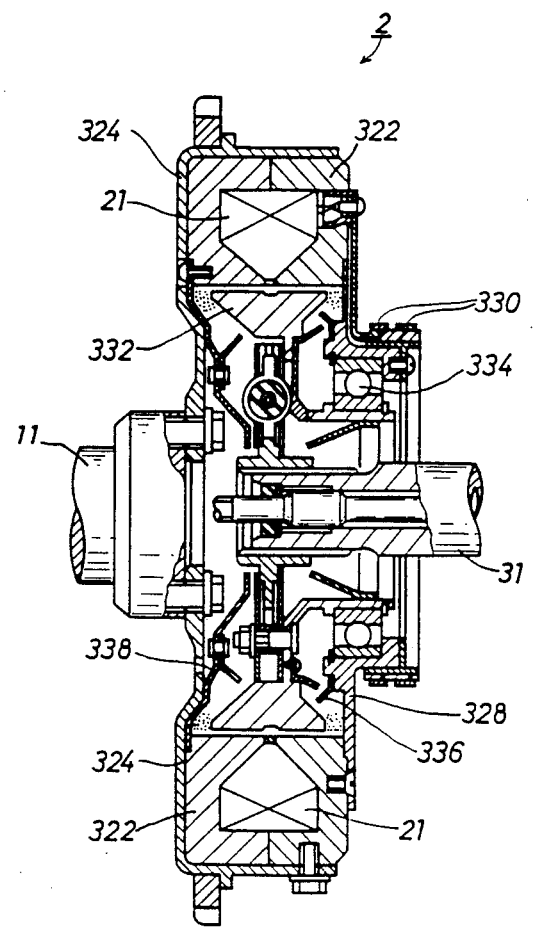
FIG. 11 is a sectional view illustrative of a magnetic powder clutch of a second embodiment.

The fundamental structure of the second embodiment is common to that of the first embodiment as shown in FIG. 3. The speed ratio control of the second embodiment is executed in accordance with the graph of FIG. 4 in the same manner as in the first embodiment. The prominent feature of the second embodiment different from the first embodiment is that a single gap-type magnetic powder clutch is used as shown in FIG. 11.

In a magnetic powder clutch 2 of the second embodiment, the gap between a first member 322 and a second member 332 is filled with magnetic powder due to the magnetic power of an energizing coil 21. Thus, the transmitting torque responsive to the energizing current provided to the energizing coil 21 is transmitted in accordance with a predetermined transmitting torque. The first member 322 is a doughnutshaped yoke. As shown in FIG. 11, the first member 322 is fixed to an output shaft 11 of the engine 1 via a first connecting member 324. The first member 322 includes the built-in energizing coil 21. Energizing current is supplied to the coil 21 via slip rings 330 provided on a first labyrinth retainer 328 which rotates with the first member 322. The second member 332 is supported by the first labyrinth retainer 328 via a bearing 334 so as to rotate coaxially and relatively to the first member 322. The second member 332 has splines to be engaged with the splines formed at the end of an input shaft 31 of the CVT 3. The first labyrinth retainer 328 is equipped with a ring projection 336. A second labyrinth retainer 338 is also equipped with another ring projection, and is fixed to the output shaft 11. These projections and the second labyrinth retainer 338 make up an almost closed ring hollow space in which magnetic powder is enclosed. The magnetic powder within the hollow space is gathered into the gap between the external surface of the second member and the internal surface of the first member due to the magnetic power of the energizing coil 21 and then magnetically unites with each other. Thus, the revolution speed of the output shaft 11 of the engine 1 is transmitted to the input shaft 31 of the CVT 3 at a torque responsive to the energizing current suplied to the coil 21. The above-mentioned output shaft 11 and the input shaft 31 respectively correspond to the input shaft and output shaft of the magnetic powder clutch 2, respectively.

Figure 12:
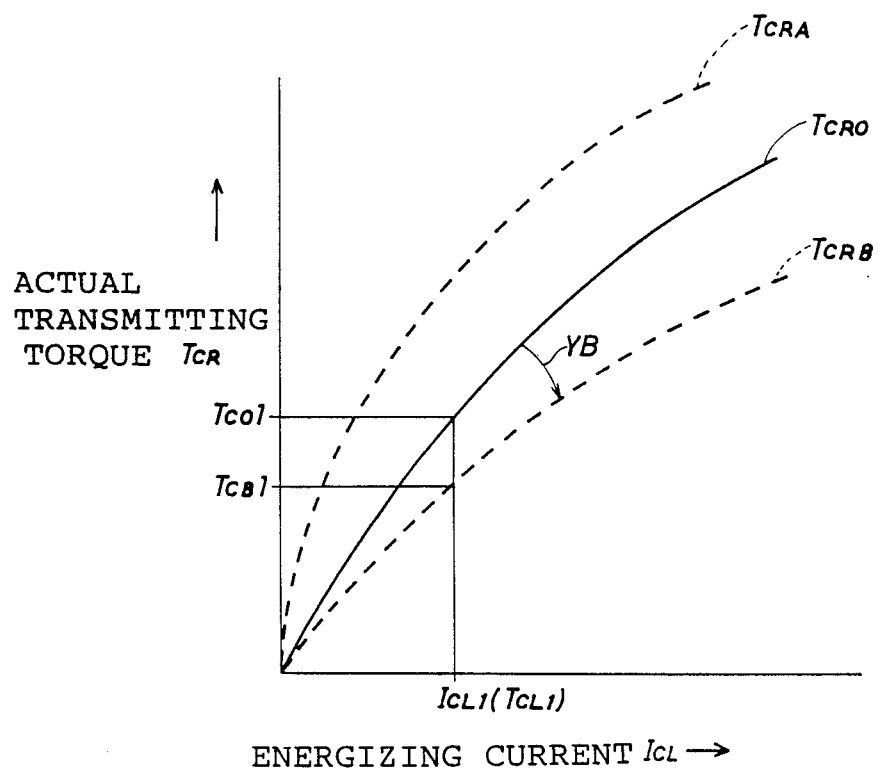
FIG. 12 is a graph showing a characteristic of an actual transmitting torque of the second embodiment.

The transmitting torque of the magnetic powder clutch 2 is proportional to the energizing current ICL supplied to the energizing coil 21. The relationship between the energizing current ICL and an actual transmitting torque TCR of the magnetic powder clutch 2 is shown in FIG. 12. In the graph, a solid line TCRO indicates the relationship between ICL and TCR at an initial state or an averaged relationship. Dashed lines TCRA and TCRB indicate range of fluctuations attributable to the mechanical disparity of the magnetic powder clutch or the characteristic change in relation to time.

Figure 13:
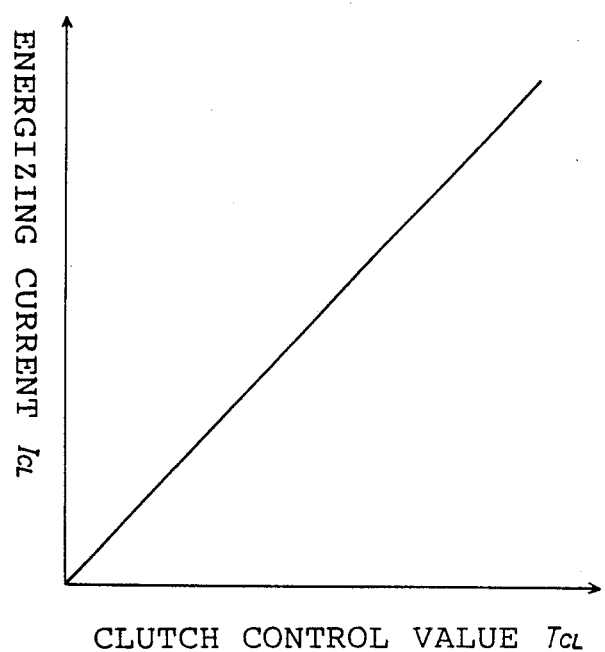
FIG. 13 is a graph showing an energizing current characteristic of the second embodiment.
Figure 14:
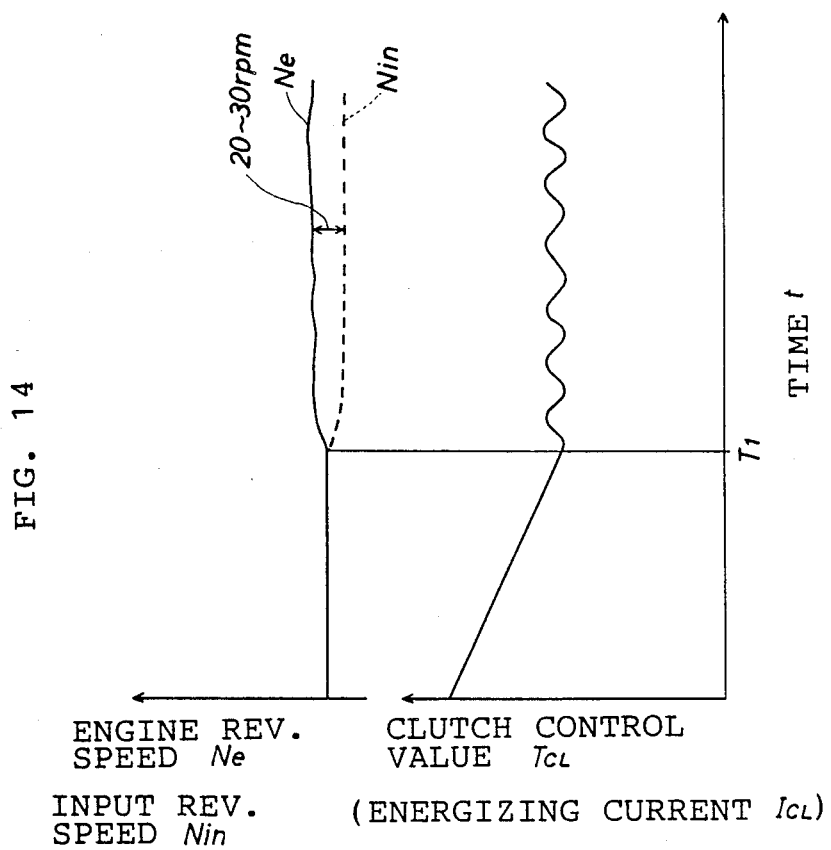
FIG. 14 is a timing chart for explaining a slip control of the second embodiment.

In a slip control of the second embodiment for determining the actual transmitting torque TCR of the magnetic powder clutch, a small fluctuation in an engine torque in a short period of time can be absorbed by slightly slipping the magnetic powder clutch 2. In this control, the ECU 4 calculates a clutch control value TCL by which an engine torque fluctuation is not transmitted to the output shaft of the magnetic powder clutch 2 tut the slip of the clutch is minimized. This clutch control value TCL is converted into an energizing current ICL based on a graph shown in FIG. 13 for controlling the slip of the magnetic powder clutch 2. As shown in the timing chart of FIG. 14, if the engine torque fluctuation is absorbed by the slip control (not shown), the clutch control value TCL is controlled by a feedback process after the time point T1, and consequently the output revolution speed Nin of the magnetic powder clutch (the input revolution speed of CVT 3) is maintained at a level 20–30 rpm lower than the engine revolution speed Ne without fluctuation.

Figure 15:
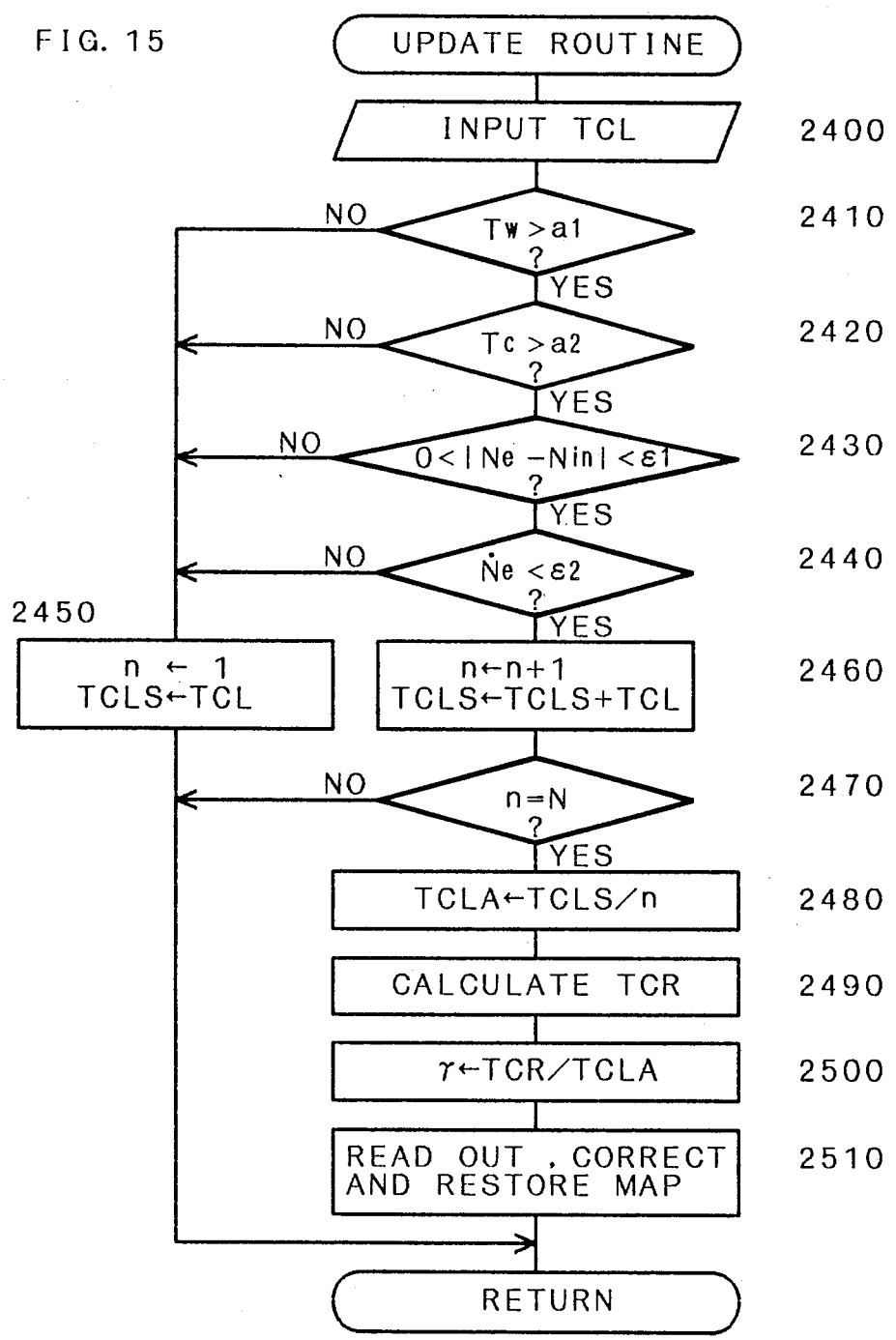
FIG. 15, is a flow chart of an energizing current calculation map updating routine in the second embodiment.

With such a well-known slip control, an energizing current calculation map updating routine shown in FIG. 15 is executed. The purpose of this control routine is to compensate the change in the relationship between the energizing current ICL and the actual transmitting torque TCR shown in FIG. 12. First, at step 2400, the clutch control value, i.e., a target transmitting torque TCL, which has been calculated in the slip control routine (not shown) and stored in the RAM 45, is read out. Subsequently, at steps 2410 through 2440, it is determined whether the condition exists for updating the energizing current calculation map by compensating the map with the ratio of the averaged value TCLA of the TCL to the actual transmitting torque TCR. Namely, it is determined whether the fluctuation in the transmitting torque of the magnetic powder clutch 2 is less than a predetermined value.

It is determined that the condition is ready for calculating the above-mentioned ratio $\gamma$ in case the determinations at steps 2410 through 2440 are as follows: an engine coolant temperature Tw detected by a temperature sensor 16 is larger than a preset value a1 (step 2410); a housing temperature Tc detected by a clutch environment temperature sensor 23 is over a preset value a2 (step 2420); a slip amount, i.e., the absolute value of the difference between the engine revolution speed Ne detected by the engine revolution sensor 15 and the input revolution speed Nin detected by the revolution speed sensor 37, is less than a preset value $\epsilon1$ (step 2430); and the change rate Ṅe of the engine revolution speed Ne in a unit time is less than a preset value $\epsilon2$ (step 2440). On the other hand, if any one of the answers at the determination steps 2410 through 2440 is 'NO', the condition is deemed insufficient.

If it is determined at steps 2410 through 2440 that the condition is still insufficient for calculating the ratio $\gamma$, the process step proceeds to step 2450 at which the counter n is reset to 1, and the value TCLS, the accumulation of TCL, is updated by the TCL read out at step 2400. Then, the present routine terminates.

Figure 16:
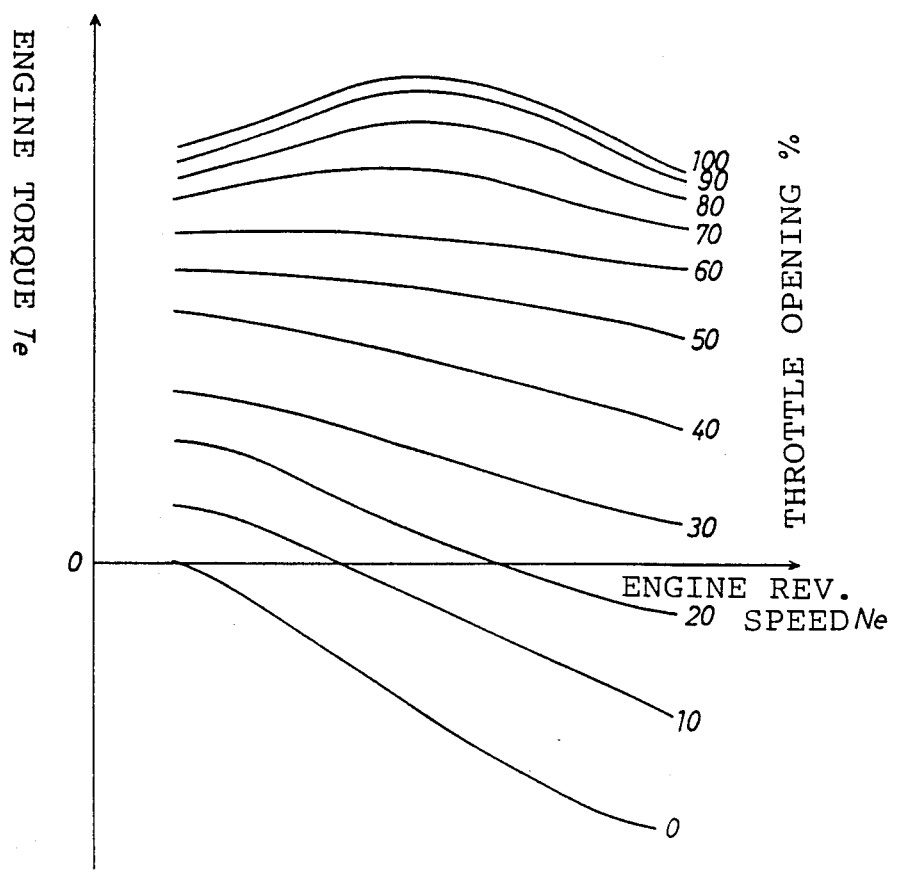
FIG. 16 is a graph illustrating an engine torque characteristic the second embodiment.

On the other hand, if it is determined that the above-mentioned condition is satisfied, the counter n is increased by 1, and the value TCL read out at step 2400 is added to TCLS at step 2460. The addition of TCL is repeated until the value of the counter n becomes N at step 2470. When n=N, an average value of TCL, TCLA=TCLS/n, is calculated based on the accumulated value TCLS at the subsequent step 2480. As shown in the timing chart of FIG. 14, it is possible to get a central value of TCL showing a little fluctuation due to the feedback control after the time point T1 by utilizing the average value TCLA. As a result, the accuracy in the calculation of the ratio $\gamma$ is increased. After the calculation of the average value TCLA at step 2480, the actual transmitting torque TCR of the magnetic powder clutch 2 is calculated at step 2490. So far as the condition is satisfied to calculate the ratio $\gamma$ in the present control routine, the actual transmitting torque TCR is equal to the engine torque Te. The engine torque Te is determined based on the engine torque map of FIG. 16 defined by the throttle opening $\theta$ and the engine revolution speed Ne. The engine torque map is previously stored in the ROM 44. Then, the calculated engine torque Te is used as the actual transmitting torque TCR. Moreover, it is possible to determine the actual transmitting torque TCR by utilizing a torque sensor (not shown) installed between the engine 1 and the magnetic powder clutch 2.

At step 2500, the ratio $\gamma$ (=TCR/TCLA) is determined based on the values TCLA and TCR calculated at steps 2480 and 2490, respectively. At the subsequent step 2510, an energizing current calculation map (not shown) for calculating energizing current ICL from the clutch control value TCL stored in the non-volatile memory EEPROM 47, is compensated by the ratio $\gamma$, and stored again in the memory 47. Since the above-mentioned energizing current calculation map is stored in the EEPROM 47, the updated map responsive to the change in the clutch characteristic can be maintained even though the ignition switch is turned off.

As described so far, by calculating the energizing current ICL from the clutch control value TCL with reference to the energizing current calculation map updated by the ratio $\gamma$, the change in the actual transmitting torque as shown in FIG. 12 can be compensated. If the compensation by the ratio $\gamma$ is not carried out, for example, in case that the magnetic powder clutch 2 deteriorates due to the change with time or that the operating condition of the magnetic powder clutch fluctuates due to the change in the temperature or the disparity among the products, the initial or average transmitting torque TCRO shown by a solid line in FIG. 12 shifts in the direction of YB to the curve of TCRB shown by a dashed line. When an energizing current ICL1 is supplied to the magnetic powder clutch 2 in response to a preset clutch control value TCO1, the actual transmitting torque TCR becomes equal to TCO1 at an initial state, while on the other hand, TCR shifts to a value TCB1 after deterioration. Such a change can be prevented in the present embodiment. By energizing the magnetic powder clutch 2 with the energizing current ICL responsive to the clutch control value TCL in reference to the $\gamma$-compensated energizing current calculation map, the energizing current ICL is multiplied by 1/γ and thus the actual transmitting torque TCR is also multiplied by 1/γ. As a result, the actual transmitting torque TCR equivalent to the above-mentioned control value TCL can be obtained. Although the uniform compensation ratio γ is used in the present embodiment supposing that the clutch characteristic changes in a same ratio against every clutch control value TCL, a higher accurate compensation can be realized by updating the energizing current calculation map in response to each of the clutch control values TCL. Moreover, it is also possible to regulate the change in the characteristic of the magnetic powder clutch 2 in a short period of time due to a thermal factor or the like.

By updating the energizing current calculation map based on the ratio γ(=TCR/TCLA) of the control value TCL to the actual transmitting torque TCR, a target energizing current ICL is obtained so that the control value TCL utilized in the slip, creep and start controls is always equalized to the actual transmitting torque TCR of the magnetic powder clutch 2. As a result, the target clutch control value TCL and the actual transmitting torque TCR are always controlled to be equal even through the characteristic of the magnetic powder clutch 2 changes with the lapse of time. Namely, the transmitting torque of the magnetic powder clutch 2 can be controlled in high accuracy.

Figure 17:
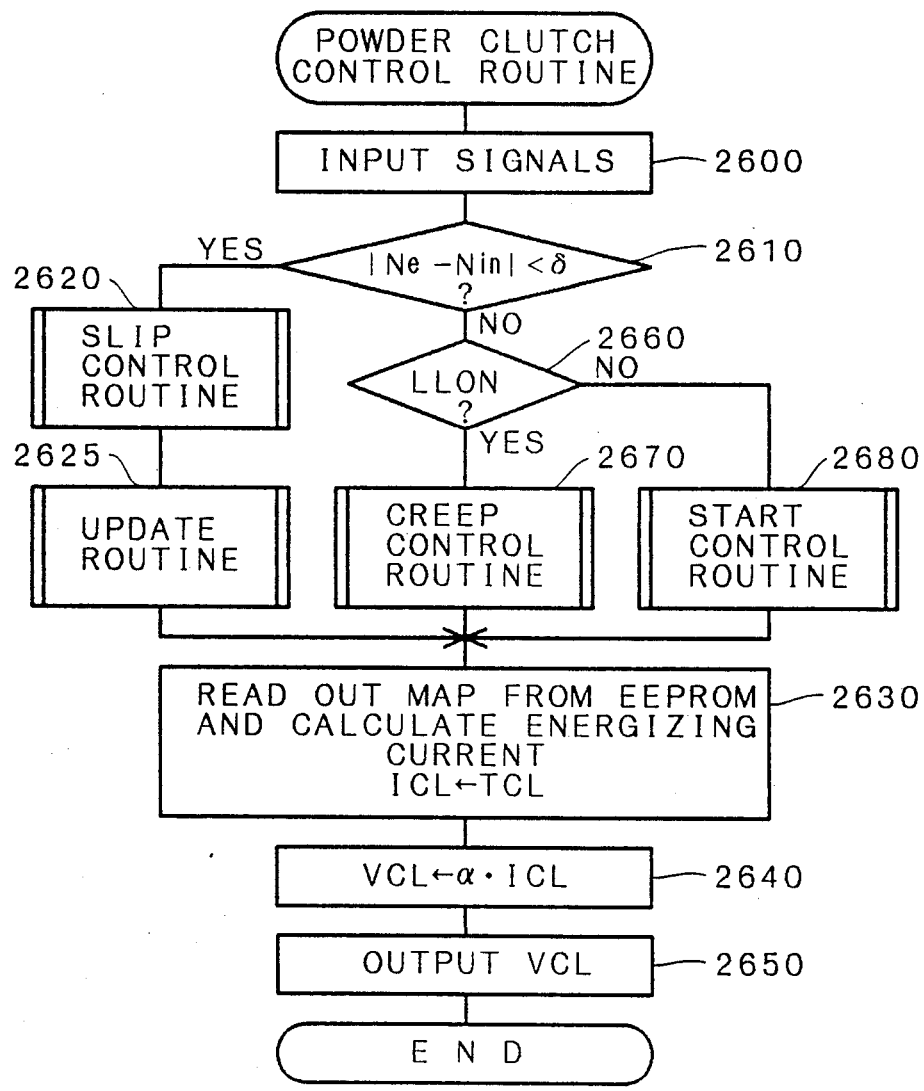
FIG. 17 is a flow chart of a magnetic powder clutch control routine of the second embodiment.
Figure 18:
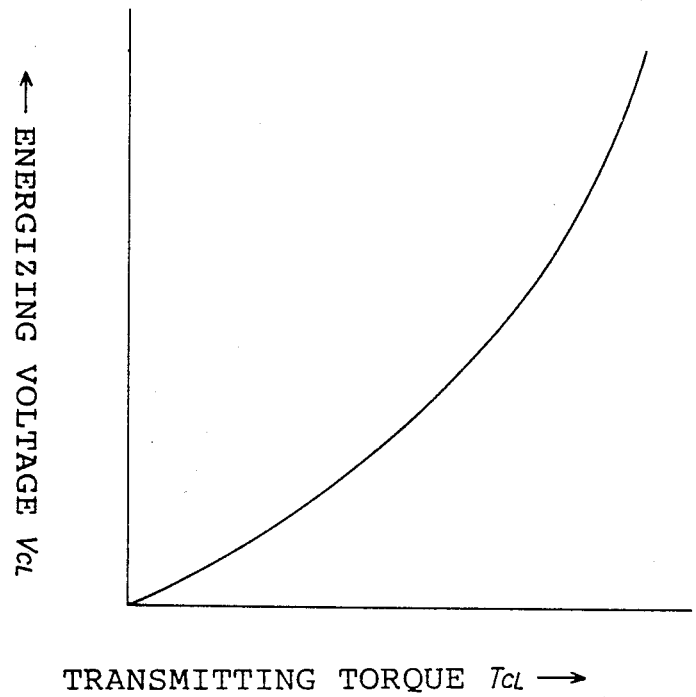
FIG. 18 is a graph showing an energizing characteristic of a conventional magnetic powder clutch.
Figure 19:
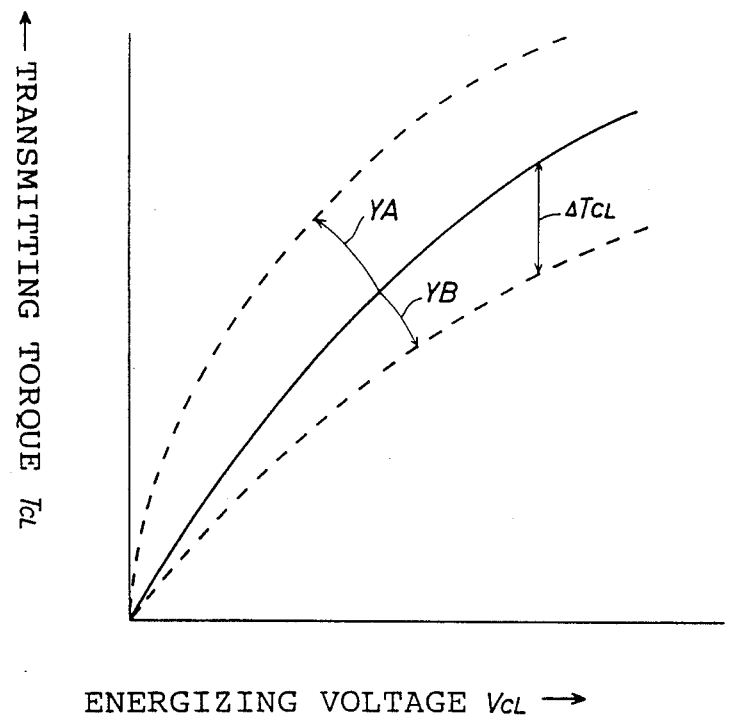
FIG. 19 is a graph explaining a change in the energizing characteristic of the conventional powder clutch.

Set forth below is the explanation of a magnetic powder clutch control routine in reference to the flow chart of FIG. 17. This routine is for energizing the magnetic powder clutch 2. In this routine, one of control routines is selected on the basis of the operating condition of the magnetic powder clutch 2. The control routines are: the energizing current calculation map updating routine shown in FIG. 15 and is executed with the slip control routine (not shown); the creep control routine; and the start control routine. The magnetic powder clutch 2 is energized in response to each of the clutch control values TCL determined in the above-mentioned routines based on the updated energizing current calculation map. First, at step 2600, the data to be utilized in every control hereafter is inputted from various sensors. Next, at step 2610, it is determined whether or not the slip amount |Ne - Nin|, i.e., the absolute value of the difference between the engine revolution speed Ne detected by the sensor 15 and the input revolution speed Nin detected by the sensor 37, is less than a preset value δ. If the result is 'YES', the magnetic powder clutch is only slightly slipping so as to execute the slip control routine for absorbing the fluctuation in the engine torque at step 2620. Subsequently, at step 2625, the energizing current calculation map updating routine shown in FIG. 15 is executed by utilizing the clutch control value TCL determined in the above-mentioned slip control routine. After step 2625, the energizing current ICL responsive to the clutch control value TCL is calculated at step 2630 based on the energizing current calculation map which is updated at step 2625 and stored in the EEPROM 47. At step 2640, a control voltage VCL to be supplied to the clutch coil driver 49d is calculated in response to the energizing current ICL. The driver 49d includes a constant current amplifier. The above mentioned control voltage VCL is outputted to the clutch coil driver 49d at step 2650. The clutch coil driver 49d supplies the energizing current in response to the control voltage VCL to the coil 21 of the magnetic powder clutch 2. Thus, the actual transmitting torque TCR of the magnetic powder clutch 2 is controlled to be equivalent to the clutch control value TCL calculated at step 2620.

On the other hand, if the slip amount |Ne - Nin| of the magnetic powder clutch 2 is greater than or equal to the preset value δ |Ne - Nin| ≧ δ) at step 2610, controls are executed as set forth below. First, at step 2660, it is determined whether or not an idle switch LL is switched on. If the switch is ON, namely, the engine 1 is idling, the creep control routine (flow chart not shown) is carried out at step 2670 for calculating the clutch control value TCL. In the creep control routine, the actual transmitting torque of the magnetic powder clutch 2 is controlled to be maintained at a minimum transmitting torque TCR. On the other hand, if the idle switch LL is switched off, the start control routine (flow chart not shown) is performed at step 2680. In the start control routine, the transmitting torque of the magnetic powder clutch 2 is increased in proportion to the vehicle speed so that the engine torque Te is equalized to the transmitting torque TCR at an engagement vehicle speed or an engagement engine revolution speed.

Since actual transmitting torque TCR of the magnetic powder clutch 2 is controlled based on energizing current ICL in response to each of the clutch control value TCL determined in the slip control routine, the creep control routine or the start control routine, the actual transmitting torque of the magnetic powder clutch 2 can be alwayscontrolled to equal a target transmitting torque. Thus, the slip of the magnetic powder clutch 2 is controlled so as not to be excessively large or small due to the change with time, the mechanical disparity among the products or other circumstances, without any special operation by the driver for regulating the clutch characteristic. As a result, the durability of the magnetic powder clutch, gas mileage and maneuverability of the vehicle are improved.

Obviously, numerous modification and variations of the present invention are possible in the light of the above teachings. It is therefore to be understood that within the scope of the opened claims, the invention may be practiced otherwise than specifically described herein.

What is claimed is:

1. A control method for a magnetic powder clutch system including a magnetic powder clutch having an input shaft connected to an engine and an output shaft, comprising the steps of:
   determining an energizing strength of the magnetic powder clutch based on a target transmitting torque;
   correcting the energizing strength with a correction factor determined based on a specific powder clutch;
   energizing the magnetic powder clutch with the corrected energizing strength;
   determining an actual transmitting torque of the magnetic powder clutch when a change in a detected transmitting torque is smaller than a preset value;
   calculating a difference between the target transmitting torque and the actual transmitting torque; and
   updating the correction factor according to the calculated difference.

2. A control method for a magnetic powder clutch system according to claim 1, wherein the energizing strength determining step comprises the steps of:
   sensing a revolution speed of the engine;
   sensing a revolution speed of the output shaft;

sensing a torque of the engine;

determining a target transmitting torque of the magnetic powder clutch based on a currently required engine output;

determining an energizing strength of the magnetic powder clutch according to a correction factor based on the target transmitting torque; and the actual transmitting torque determining step comprises the steps of:

detecting a minimal slip of the input shaft and the output shaft when a difference between the sensed engine revolution speed and the detected output shaft revolution speed is between 0 and a preset value; and determining an actual transmitting torque from a sensed engine torque when the input shaft and the output shaft are determined to be at the minimal slip and a change in the engine revolution speed is smaller than a preset value.

3. A control method for a magnetic powder clutch system according to claim 2, wherein the actual transmitting torque is determined by an average value of sensed engine torque values within a preset time period during which the input shaft and the output shaft are determined to be at the minimal slip and a change in the engine revolution speed is smaller than a preset value.

4. A controller for a magnetic powder clutch having an input shaft connected to an engine and an output shaft, comprising:

an engine revolution speed detection means;

an output shaft revolution speed detection means;

an engine torque detection means;

means for generating a target transmitting torque signal of the magnetic powder clutch based on a currently required engine output;

means responsive to the target transmitting torque signal for determining an energizing strength of the magnetic powder clutch according to a correction factor;

means for generating a minimal slip signal when a difference between the sensed engine revolution speed and the detected output shaft revolution speed is between 0 and a preset value;

means responsive to the minimal slip signal for generating an actual transmitting torque signal from a sensed engine torque signal when a change in the engine revolution speed is smaller than a preset value;

means for calculating a difference between the target transmitting torque signal and the actual transmitting torque signal; and means for updating the correction factor according to the calculated difference.

5. A magnetic powder clutch controller according to claim 4, wherein the actual transmitting torque signal generating means comprises:

means for storing sensed engine torque values within a preset time period during which the minimal slip signal is generated and a change in the sensed engine revolution speed is smaller than a preset value; and means for calculating an average value of the stored engine torque values and for generating an actual transmitting torque signal based on the average value.

* * * * *